US010763985B2

(12) United States Patent
Ratasuk et al.

(10) Patent No.: US 10,763,985 B2
(45) Date of Patent: Sep. 1, 2020

(54) CONTROL CHANNEL DESIGN AND USE FOR NARROW BAND COMMUNICATION

(71) Applicant: Nokia Solutions and Networks Oy, Espoo (FI)

(72) Inventors: Rapeepat Ratasuk, Hoffman Estates, IL (US); Shi Jin, Beijing (CN); YuanTao Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 61 days.

(21) Appl. No.: 16/068,390

(22) PCT Filed: Jan. 11, 2016

(86) PCT No.: PCT/CN2016/070596
§ 371 (c)(1),
(2) Date: Jul. 6, 2018

(87) PCT Pub. No.: WO2017/120742
PCT Pub. Date: Jul. 20, 2017

(65) Prior Publication Data
US 2019/0028221 A1    Jan. 24, 2019

(51) Int. Cl.
*H04W 24/08* (2009.01)
*H04J 11/00* (2006.01)
(Continued)

(52) U.S. Cl.
CPC ........ *H04J 11/0069* (2013.01); *H04L 1/0038* (2013.01); *H04L 5/0037* (2013.01);
(Continued)

(58) Field of Classification Search
CPC combination set(s) only.
See application file for complete search history.

(56) References Cited

U.S. PATENT DOCUMENTS

2014/0029542 A1*  1/2014  Xu .............. H04L 5/0053
                                              370/329
2014/0301292 A1* 10/2014  Chen ............ H04L 5/0092
                                              370/329
(Continued)

FOREIGN PATENT DOCUMENTS

CN       105122925 A    12/2015
WO    WO-2015/170855 A1  11/2015

OTHER PUBLICATIONS

3GPP TS 36.211 V12.7.0, "3rd Generation Partnership Project; Technical Specification Group Radio Access Network; Evolved Universal Terrestrial Radio Access (E-UTRA); Physical channels and modulation (Release 12)", Sep. 2015, 136 pgs.
(Continued)

Primary Examiner — Fahmida S Chowdhury
(74) Attorney, Agent, or Firm — Harrington & Smith

(57) ABSTRACT

REGs are mapped to REs for UEs to all available OFDM symbols for a subframe, which includes a time-frequency resource space including the OFDM symbols in time and subcarriers in frequency. The mapping is performed to form a portion of a control channel and the available symbols are OFDM symbols not used for another control channel. The REs are populated in the portion of the control channel with control information for the UEs using corresponding ones of the REGs. The mapping and the populating are performed to form a complete control channel over one or more subframes, wherein the complete control channel can span a single subframe or multiple subframes. The one or more subframes with the complete control channel are transmitted. A UE will blind decode received subframe(s) in order to determine the control information, which is to be subsequently used by the UE to receive or transmit data.

18 Claims, 8 Drawing Sheets

(51) Int. Cl.
*H04W 72/04* (2009.01)
*H04L 5/00* (2006.01)
*H04L 1/00* (2006.01)

(52) U.S. Cl.
CPC .......... *H04L 5/0048* (2013.01); *H04L 5/0053* (2013.01); *H04W 24/08* (2013.01); *H04W 72/0406* (2013.01); *H04W 72/0446* (2013.01); *H04L 5/0007* (2013.01)

(56) References Cited

U.S. PATENT DOCUMENTS

| 2016/0112997 | A1* | 4/2016 | Chen | H04W 24/08 |
| | | | | 370/329 |
| 2017/0195102 | A1* | 7/2017 | Xiong | H04W 72/0426 |
| 2017/0223725 | A1* | 8/2017 | Xiong | H04W 72/042 |

OTHER PUBLICATIONS

R1-150428, "MTC Operation with a Narrowband PDCCH", Sonly, 3GPP TSG-RAN WG1 Meeting #80, Feb. 2015, 16 pgs.
R1-156462, "NB-IOT-downlink physical layer concept description", Huawei, HiSilicon, 3GPPTSG RAN WG1 Meeting #83, Nov. 2015, 11 pgs.
R1-157070, "DL design for NB-IOT", Qualcomm Incorporated, 3GPP TSG RAN WG1 #83, Nov. 2015, 8 pgs.
3GPP TSG RAN Meeting #70, Sitges, Spain, Dec. 7-10, 2015, RP-152284, "Revised Work Item: Norrowband IoT (NB-IoT)", Huawei, HiSilicon, 11 pgs.

* cited by examiner

CONTROL CHANNEL DESIGN AND USE FOR NARROW BAND COMMUNICATION

This patent application is a U.S. National Stage application of International Patent Application Number PCT/CN2016/070596 filed Jan. 11, 2016, which is hereby incorporated by reference in its entirety.

TECHNICAL FIELD

This invention relates generally to wireless communications and, more specifically, relates to control channel design and use in wireless communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

At 3GPP LTE RAN #69 plenary meeting, a new work item named NB-IoT was approved. According to the WID, NB-IoT will support the following three operation modes:
Stand-alone operation, utilizing for example the spectrum currently being used by GERAN systems as a replacement of one or more GSM carriers.
Guard-band operation, utilizing the unused resource blocks within an LTE carrier's guard-band.
In-band operation, utilizing resource blocks within a normal LTE carrier.

The NB-IoT is expected to support up to a 20 dB coverage improvement, a massive number of low throughput devices, low delay sensitivity, ultra-low device cost, low device power consumption, and (e.g., optimized) network structure. Furthermore, NB-IoT bandwidth is only 180 kHz, corresponding to one PRB (and 12 subcarriers) in LTE.

At the 3GPP RAN1#83 meeting, it was agreed that a proposal for NB-IoT DL channel is for downlink transmission with 15 kHz subcarrier spacing for all the modes: stand-alone, guard-band, and in-band. Additionally, the working assumptions are that NB-IoT supports operation with more than one DL Tx antenna port and for operation with two DL Tx antenna ports, NB-IoT uses SFBC.

There is, however, no clear design of a control channel for the NB-IoT downlink or uplink channels.

BRIEF SUMMARY

This section is intended to include examples and is not intended to be limiting.

In an exemplary embodiment, a method is disclosed that comprises: mapping, at a base station, resource element groups to resource elements for user equipment to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel; populating, at the base station, the resource elements in the portion of the control channel with control information for the user equipment using corresponding ones of the resource element groups; performing the mapping and the populating to form a complete control channel over one or more subframes, wherein the complete control channel can span a single subframe or multiple subframes; and transmitting by the base station the one or more subframes with the complete control channel.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

Another example is an apparatus, comprising: means for mapping, at a base station, resource element groups to resource elements for user equipment to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel; means for populating, at the base station, the resource elements in the portion of the control channel with control information for the user equipment using corresponding ones of the resource element groups; means for performing the mapping and the populating to form a complete control channel over one or more subframes, wherein the complete control channel can span a single subframe or multiple subframes; and means for transmitting by the base station the one or more subframes with the complete control channel.

An example of an apparatus includes one or more processors and one or more memories including computer program code. The one or more memories and the computer program code are configured to, with the one or more processors, cause the apparatus to perform at least the following: mapping, at a base station, resource element groups to resource elements for user equipment to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel; populating, at the base station, the resource elements in the portion of the control channel with control information for the user equipment using corresponding ones of the resource element groups; performing the mapping and the populating to form a complete control channel over one or more subframes, wherein the complete control channel can span a single subframe or multiple subframes; and transmitting by the base station the one or more subframes with the complete control channel.

An example of a computer program product includes a computer-readable storage medium bearing computer program code embodied therein for use with a computer. The computer program code includes: code for mapping, at a base station, resource element groups to resource elements for user equipment to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel; code for populating, at the base station, the resource elements in the portion of the control channel with control information for the user equipment using corresponding ones of the resource element groups; code for performing the mapping and the populating to form a complete control channel over one or more subframes, wherein the complete control channel can span a single subframe or multiple subframes; and code for transmitting by the base station the one or more subframes with the complete control channel.

In an additional example, another method comprises: receiving at a user equipment one or more subframes, each of the one or more subframes having a portion of a complete control channel comprising control information, wherein the portion of the control channel has resource element group to resource element mapping to all available orthogonal frequency division multiplexing symbols in a subframe, wherein the subframe comprises a time-frequency resource space comprising the orthogonal frequency division multiplexing symbols in time and subcarriers in frequency, and wherein the available symbols are orthogonal frequency division multiplexing symbols not used for another control channel; and blind decoding the received one or more subframes in order to determine the control information, wherein the control information is to be subsequently used by the user equipment to receive or transmit data.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In a further example, an apparatus comprises: means for receiving at a user equipment one or more subframes, each of the one or more subframes having a portion of a complete control channel comprising control information, wherein the portion of the control channel has resource element group to resource element mapping to all available orthogonal frequency division multiplexing symbols in a subframe, wherein the subframe comprises a time-frequency resource space comprising the orthogonal frequency division multiplexing symbols in time and subcarriers in frequency, and wherein the available symbols are orthogonal frequency division multiplexing symbols not used for another control channel; and means for blind decoding the received one or more subframes in order to determine the control information, wherein the control information is to be subsequently used by the user equipment to transmit or receive data.

An example of an apparatus includes one or more processors and one or more memories including computer program code. The one or more memories and the computer program code are configured to, with the one or more processors, cause the apparatus to perform at least the following: receiving at a user equipment one or more subframes, each of the one or more subframes having a portion of a complete control channel comprising control information, wherein the portion of the control channel has resource element group to resource element mapping to all available orthogonal frequency division multiplexing symbols in a subframe, wherein the subframe comprises a time-frequency resource space comprising the orthogonal frequency division multiplexing symbols in time and subcarriers in frequency, and wherein the available symbols are orthogonal frequency division multiplexing symbols not used for another control channel; and blind decoding the received one or more subframes in order to determine the control information, wherein the control information is to be subsequently used by the user equipment to transmit or receive data.

An example of a computer program product includes a computer-readable storage medium bearing computer program code embodied therein for use with a computer. The computer program code includes: code for receiving at a user equipment one or more subframes, each of the one or more subframes having a portion of a complete control channel comprising control information, wherein the portion of the control channel has resource element group to resource element mapping to all available orthogonal frequency division multiplexing symbols in a subframe, wherein the subframe comprises a time-frequency resource space comprising the orthogonal frequency division multiplexing symbols in time and subcarriers in frequency, and wherein the available symbols are orthogonal frequency division multiplexing symbols not used for another control channel; and code for blind decoding the received one or more subframes in order to determine the control information, wherein the control information is to be subsequently used by the user equipment to transmit or receive data.

DETAILED DESCRIPTION OF THE DRAWINGS

Figure 1:
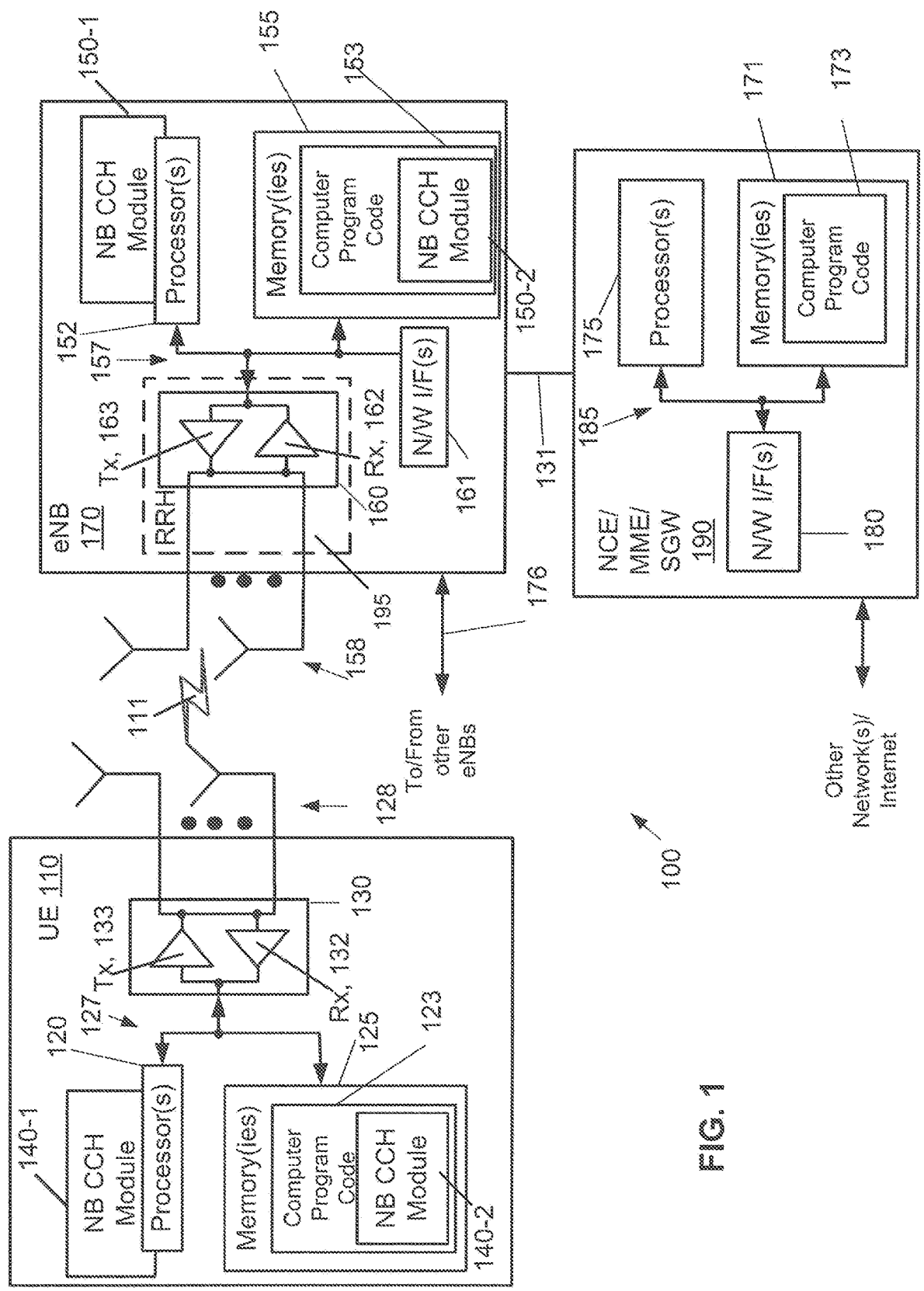
FIG. 1 is a block diagram of one possible and non-limiting exemplary system in which the exemplary embodiments may be practiced.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Proposals for NB-IoT for downlink transmissions and working assumptions for NB-IoT have been described above. With regard to these, due to only one PRB being accessible by each specific NB-IoT UE per each subframe, a new design for the control channel (called the NB-PDCCH herein) is needed. Since the working assumption is that NB-IoT uses SFBC, only cell-specific reference signals for the downlink would be needed. Therefore, it is proposed herein that the NB-PDCCH channel design should be based on the PDCCH rather than ePDCCH. Using ePDCCH is possible and this use has been proposed before. However, the ePDCCH requires the use of DMRS (Demodulation Reference Signal), which makes the implementation complex. So, it is preferred to use the NB-PDCCH based on the PDCCH channels. The description below outlines examples of control channel design and use for narrow band communications for, e.g., NB-IoT.

Examples described below include the following possibilities:

Resource Element Group (REG) to Resource Element (RE) mapping extends to all available OFDM symbols in each PRB. Mapping is per subframe, although the search space may extend to multiple subframes. Mapping is performed in the same manner for all three operation modes (stand-alone, in-band, and guard-band). The available OFDM symbols in each PRB can be explicitly indicated to the UE via broadcast information (e.g. using the Narrowband Physical Broadcast Channel (NB-PBCH), using the System Information Block, etc.), implicitly indicated (e.g., based on operation mode (stand-alone, in-band, or guard-band), based on system bandwidth, etc.) or provided in a specification.

Control Channel Element (CCE) to REG mapping is performed using consecutive REGs within one subframe at a time. Alternately, CCE to REG mapping is performed in a distributed or random manner.

A fixed number of CCEs in one subframe is used regardless of operation mode and number of available REs. CCE size in term of number of REGs is variable depending on how many symbols are reserved for a legacy control channel.

Different search spaces can be constructed from one or more subframes. The search spaces may be multiplexed in the time domain.

A search space can be distributed in time (e.g., discontinuous in time) to allow for time diversity and multiplexing of search spaces of different sizes. The distribution in time can also minimize block probability by allowing other UEs to be scheduled in between scheduling of control information for one particular UE. For instance, other UEs can be scheduled in between the discontinuous control information scheduling of one UE. As a specific example, discontinuous subframes #0/1/2/5/6/7 may be used for UE1 and subframes #3/4 may be used for UE2.

A design using some or all of these techniques allows construction of an NB-PDCCH that is consistent among all operation modes. Such a design also allows for efficient multiplexing of NB-PDCCHs from UEs with different search spaces. The support for a time-discontinuous search space can provide some time diversity gain and minimize blocking probability (i.e., allows other UEs to be scheduled in between).

Additional detailed descriptions and embodiments are provided in the after a system into which the exemplary embodiments may be used is described.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a narrow band control channel (NB CCH) module 140, comprising one of or both parts 140-1 and/or 140-2, which may be implemented in a number of ways. The NB CCH module 140 performs operations with a control channel design and use for narrow band communication in accordance with exemplary embodiments herein. The NB CCH module 140 may be implemented in hardware as NB CCH module 140-1, such as being implemented as part of the one or more processors 120. The NB CCH module 140-1 may be implemented also as an integrated circuit or through other hardware such as a programmable gate array. In another example, the NB CCH module 140 may be implemented as NB CCH module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a narrow band control channel (NB CCH) module 150, comprising one of or both parts 150-1 and/or 150-2, which may be implemented in a number of ways. The NB CCH module 150 performs control channel design and use for narrow band communication in accordance with exemplary embodiments herein. The NB CCH module 150 may be implemented in hardware as NB CCH module 150-1, such as being implemented as part of the one or more processors 152. The NB CCH module 150-1 may be implemented also as an integrated circuit or through other hardware such as a programmable gate array. In another example, the NB CCH module 150 may be implemented as NB CCH module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Now that one example of a system into which the exemplary embodiments may be used has been described, we provide additional detailed description and embodiments.

Concerning REG to RE mapping, the REG to RE mapping could depend on (1) operation mode, (2) number of symbols reserved for legacy control channel, and/or (3) number of subframes in the search space. The mapping would be performed per subframe in a time-first manner, followed by frequency manner. In the mapping, REs corresponding to four legacy CRS positions will be reserved regardless of the actual number of Tx antenna ports at the eNB 170. In addition, the REG to RE mapping comprises consecutive REs in the frequency domain.

Figure 2:
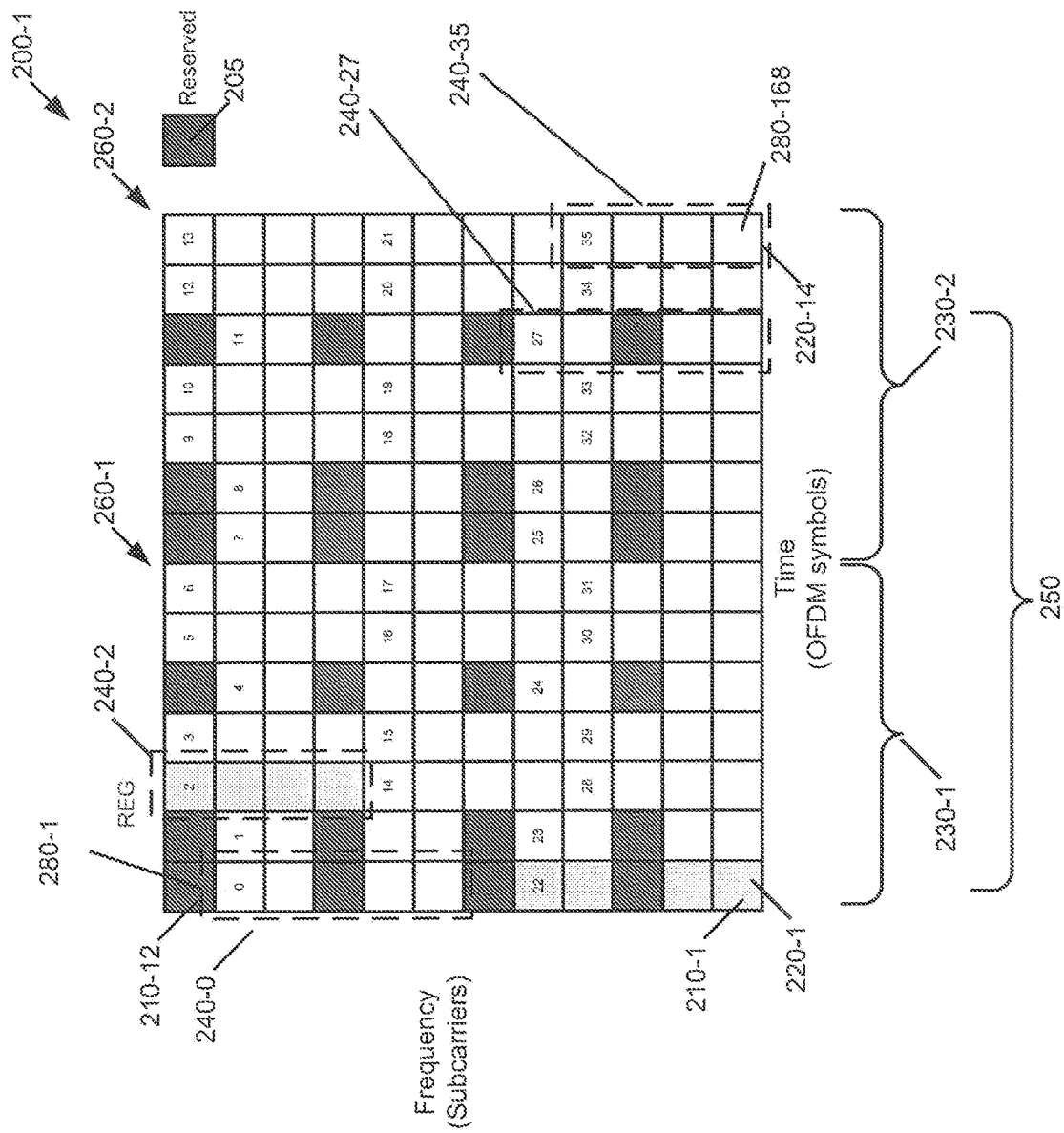
FIG. 2 illustrates an example of REG-to-RE mapping for stand-alone operation mode with a search space spanning a single subframe.

Some examples of mapping are now presented. FIG. 2 illustrates an example of REG-to-RE mapping for stand-alone operation mode with a search space spanning a single subframe. The time-frequency resource space 200-1 has frequency (in subcarriers 210-1 through 210-12) on the vertical axis and time (in OFDM symbols 220-1 through 220-14) on the horizontal axis. One subframe 250 (1 ms in duration) is shown, which is comprised of two slots 230-1 and 230-2 (each of which is 0.5 ms in duration). Two PRBs 260-1 and 260-2 are shown, each of which is 0.5 ms in duration (seven OFDM symbols 220) and spans 180 kHz in frequency (12 subcarriers 210). Each of the 168 small blocks is an RE 280 (of which REs 280-1 and 280-168 are marked). Multiple REs 280 are reserved REs 205. REGs 240-0 through 240-35 are also shown.

In the example of FIG. 2, the REG 240 to RE 280 mapping extends to all available OFDM symbols (in the REs 280) in each PRB 260 in the resource space 200. There are 36 REGs, REG 240-0 through 240-35. It is noted that each REG includes four REs 240. In most REGs 240, the REs occupy four REs 280 that are contiguous in frequency. See, e.g., REGs 240-2 and 240-35. Some REGs 240 occupy four REs 280 that have a single reserved RE 205 interspersed between pairs of REs 280. See, e.g., REGs 240-0 and 240-27.

Figure 3:
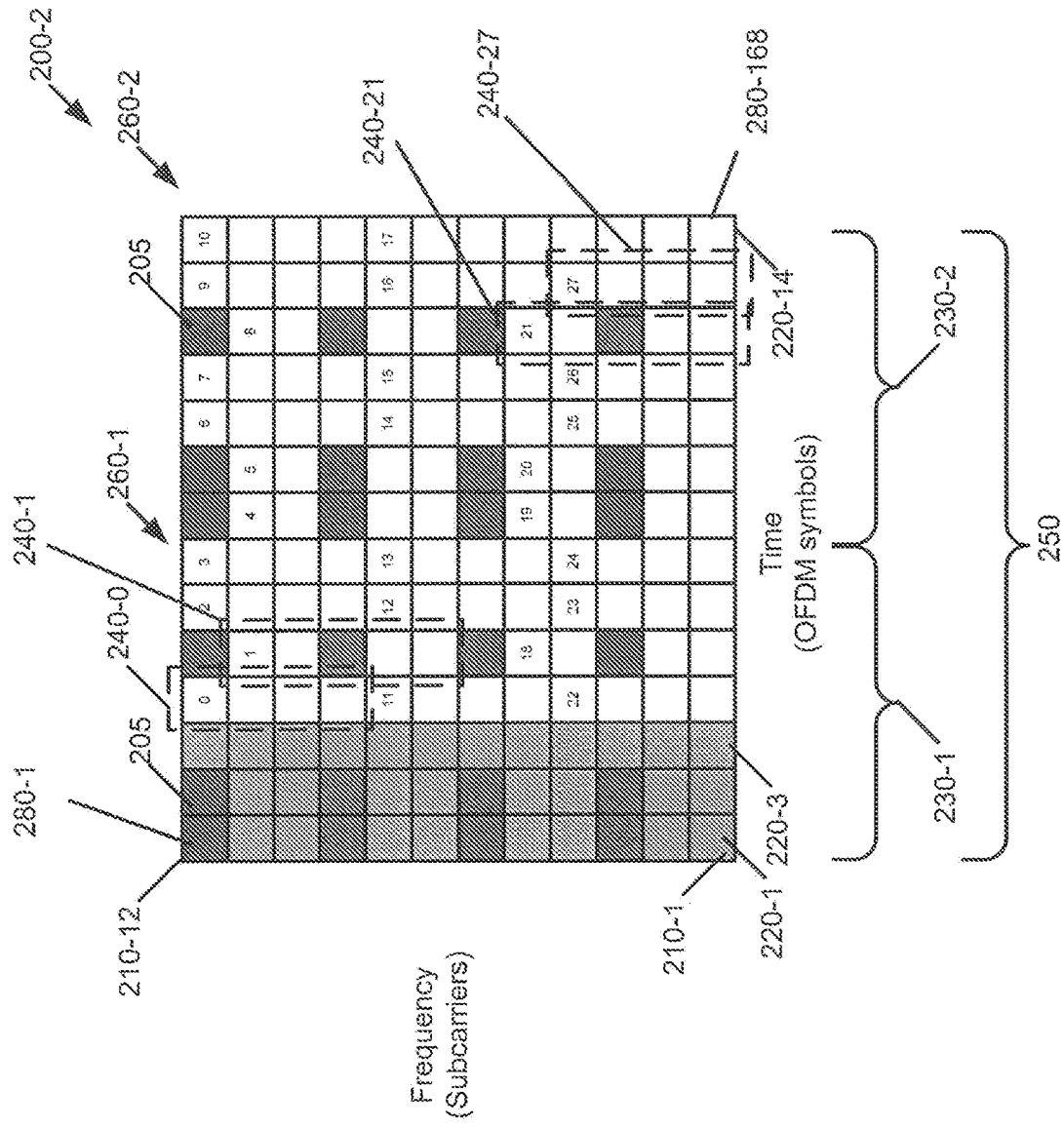
FIG. 3 illustrates an example of REG-to-RE mapping for an in-band operation mode with a search space spanning a single subframe and three OFDM symbols reserved for a legacy control region.

Referring to FIG. 3, this figure illustrates an example of REG-to-RE mapping for an in-band operation mode with a search space spanning a single subframe 200-2 and three OFDM symbols 220-1 through 220-3 reserved for a legacy control region. There are 28 REGs 240 in this example, REG 240-0 through REG 240-27. In this example, we need to construct 4 CCEs with 7 REGs in each. So, there are only REG #0-#27, but this is merely one possible example. In most REGs 240, the REs occupy four REs 280 that are contiguous in frequency. See, e.g., REGs 240-0 and 240-27. Some REGs 240 occupy four REs 280 that have a single reserved RE 205 interspersed between pairs of REs 280. See, e.g., REGs 240-1 and 240-21.

Figure 4:
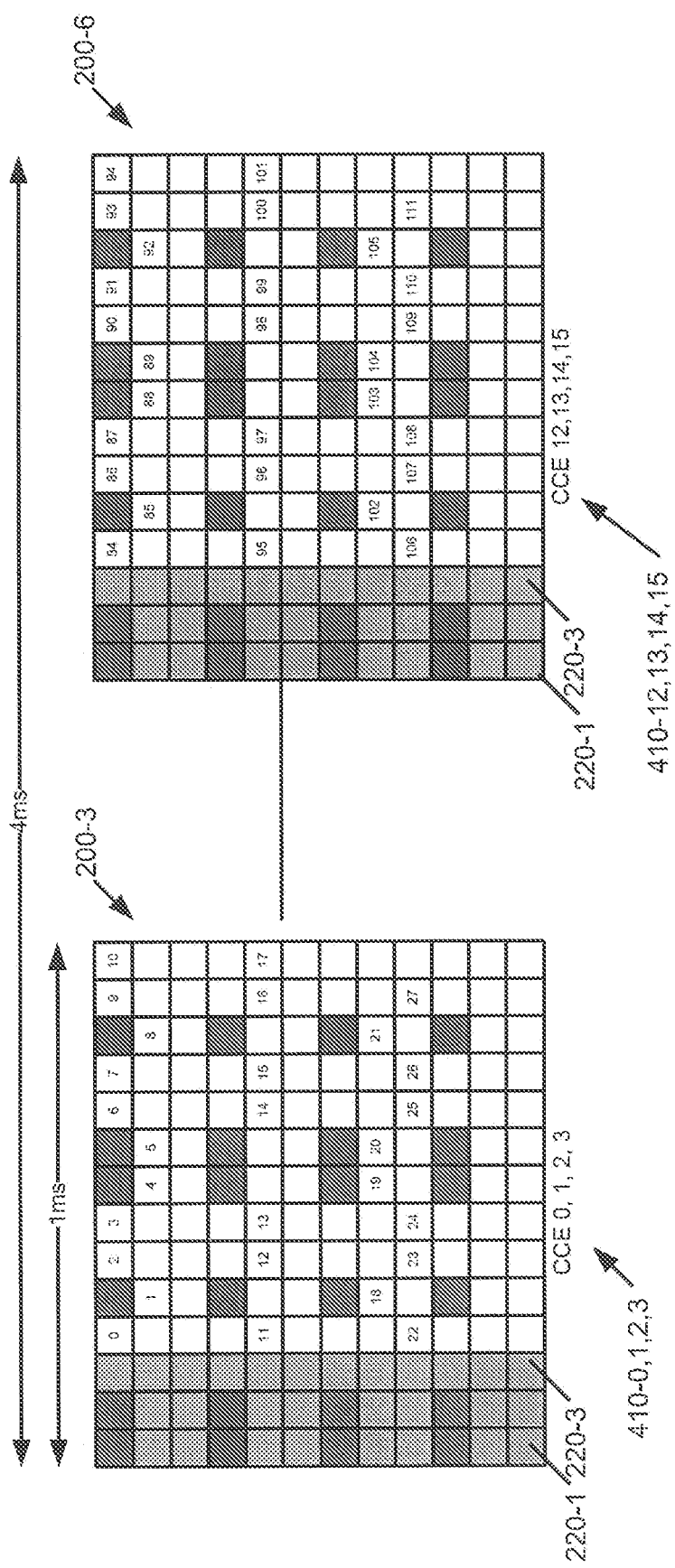
FIG. 4 illustrates an example of REG-to-RE mapping for an in-band operation mode with a search space spanning four subframes and where three OFDM symbols are reserved for legacy control region per subframe.

Turning to FIG. 4, this figure illustrates an example of REG-to-RE mapping for an in-band operation mode with a search space spanning four subframes 200-3 through 200-6 and where three OFDM symbols 220-1 through 220-3 are reserved for legacy control region per subframe. Subframes 200-3 through 200-6 are configured similarly to subframe 200-2 of FIG. 2. Subframe 200-3 corresponds to CCEs 410-0, 1, 2, and 3; Subframe 200-4 corresponds to CCEs 410-4, 5, 6, and 7; Subframe 200-5 corresponds to CCEs 410-8, 9, 10, and 11; and Subframe 200-6 corresponds to CCEs 410-12, 13, 14, and 15.

Concerning CCE 410 to REG 240 mapping, CCE size in term of number of REGs 240 may be variable depending on how many symbols are reserved for the legacy control channel. Within one subframe, there are four CCEs 410. The number of REGs 240 for each CCE 410 is provided below for different options, as a set of examples:

Stand-alone/guard-band: 9 REGs per CCE.
In-band:
  0 OFDM symbol: 9 REGs per CCE (TDM of NB-IoT and legacy control);
  1 OFDM symbol: 8 REGs per CCE;
  2 OFDM symbols: 8 REGs per CCE;
  3 OFDM symbols: 7 REGs per CCE; and
  4 OFDM symbols: 6 REGs per CCE (e.g., supported for 1.4 MHz BW).

Note that there will be some leftover REs in the subframe which will not be used.

CCE 410 to REG 240 mapping is performed using consecutive REGs per subframe at a time. For example, CCE 410-0 is made up of REGs 240-0 through 240-8. As illustrated by FIG. 4, CCEs 0-3 are in subframe 1, CCEs 4-7 are in subframe 2, and the like.

Alternately, CCE to REG mapping is performed in a distributed or random manner and across all subframes. Note that the random mapping would also need to be pre-defined for UE to perform detection.

Regarding search spaces, different search spaces can be constructed from one or more subframes 200. The search spaces may be multiplexed in the time domain. Different UEs 110 may have different search spaces due to their coverage level. For example, one UE may only need up to Aggregation Level (AL) of 2, whereas another UE needs AL=8.

Figure 5:
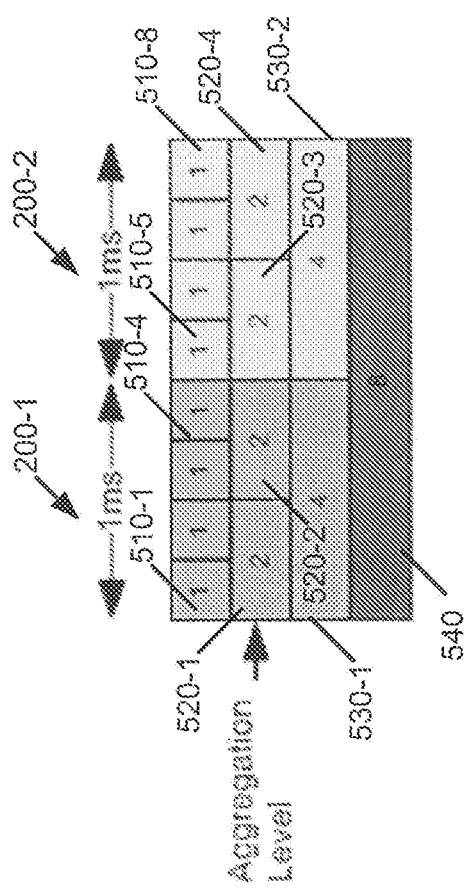
FIG. 5 illustrates an example of aggregation level and multiplexing for two search spaces, one containing one subframe, and one containing two subframes.

One example, as shown in FIG. 5, illustrates multiplexing for two search spaces, where one contains one subframe, and one contains two subframes. UEs 110 with a search space containing one subframe will search (i.e., perform blind decodings) through blocks 510-1 through 510-4, 520-1, 520-2, and 530-1 in the first subframe 200-1 and through blocks 510-5 through 510-8, 520-3, 520-4, and 530-2 in the next subframe 200-2. UEs with a search space containing two subframes will search (i.e., perform blind decodings) through the blocks 510, 520, 530 and also block 540 every two subframes. Each block 510, 520, 530, and 540 represents a CCE 410, at an aggregation level of 1, 2, 4, and 8, respectively.

Alternately, the search space can be distributed in time (e.g., discontinuous) to allow for time diversity and multiplexing of search spaces of different sizes. This can also prevent blocking for UEs that require large number of repetitions.

Figure 6:
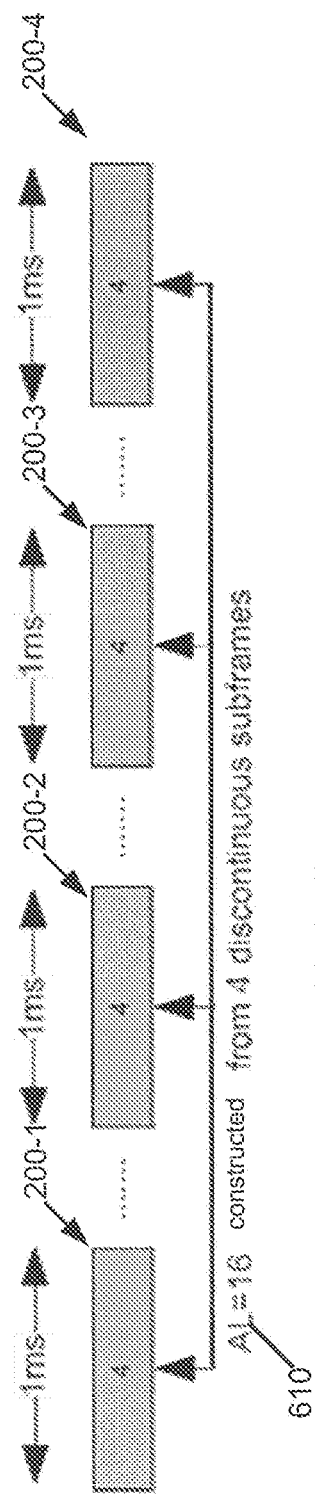
FIG. 6 illustrates spacing of search spaces using time discontinuous aggregation.

In particular, UEs 110 requiring large number of repetitions can have a search space that is distributed in time. For instance, in FIG. 6, which illustrates search spacing using time discontinuous aggregation, AL=16 is constructed (reference 610) from four discontinuous subframes 200-1 through 200-4. This provides time diversity and allows scheduling of other UEs in-between scheduling of the control channel for one UE. As described above, other UEs can be scheduled in between the discontinuous control information scheduling of one UE. For example, discontinuous subframes #0/1/2/5/6/7 could be used for control information for UE1 and subframes #3/4 used for control information for UE2.

Regarding NB-PDCCH monitoring, a starting subframe for monitoring by a UE 110 of the NB-PDCCH may be determined as follows:

1) Valid subframes are subframes not used for NB-PBCH, NB-PSS, NB-SSS, or SIBs;
2) Starting at SFN=0, UE monitors NB-PDCCH:
  a) Every K valid subframes (for UE in normal coverage); and
  b) Every K*N valid subframes, where N is the number of repetitions (e.g., for a UE in robust coverage).

The subset of {K,N} combinations will be configured, e.g., by a higher layer. The eNB 170 will only select one from the subsets to send NB-PDCCH. The UE 110 will try to blind decode the NB-PDCCH for all subsets that may be used. For each set, the blind decoding is performed as in, e.g., FIG. 5 and FIG. 6. Note that the method above starts at a SFN=0, but this could start at any fixed SFN.

Figure 7:
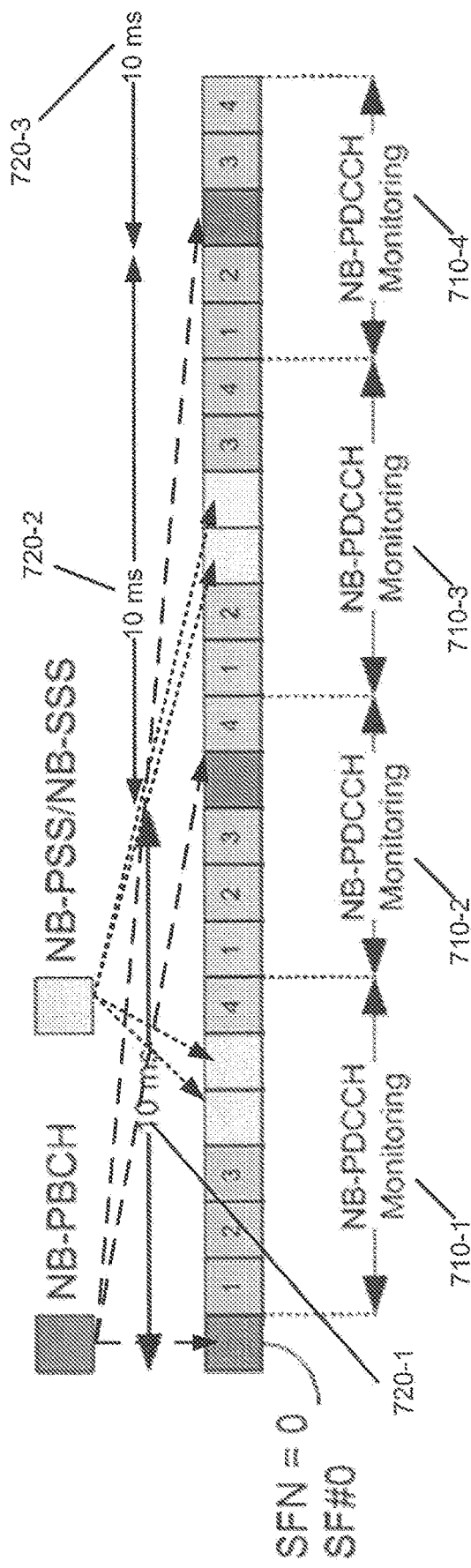
FIG. 7 illustrates NB-PDCCH monitoring of subframes based on a determined starting subframe.

One example of NB-PDCCH monitoring with K=4 (and N=1 for each NB-PDCCH monitoring window) is illustrated by FIG. 7. The subframes used for NB-PBCH and for NB-PSS/NB-SSS are shown and these are not used by a UE 110 for monitoring NB-PDCCH. In the first 10 ms (reference 720-1), the UE 110 monitors (710-1) the four subframes indicated. For the NB-PDCCH monitoring 710-2, the UE monitors the three subframes marked in the first 10 ms 720-1, and the subframe marked with 4 in the second 10 ms 720-2. For the NB-PDCCH monitoring 710-3, the UE monitors the four subframes marked in the second 10 ms 720-2, and in the NB-PDCCH monitoring 710-4, the UE monitors two subframes marked in the second 10 ms 720-2, and the subframes marked as 3 and 4 in the third 10 ms 720-3. Note that if one marks a single NB-PDCCH monitoring for four windows in this example, then there would be four repetitions (N=4).

Figure 8:
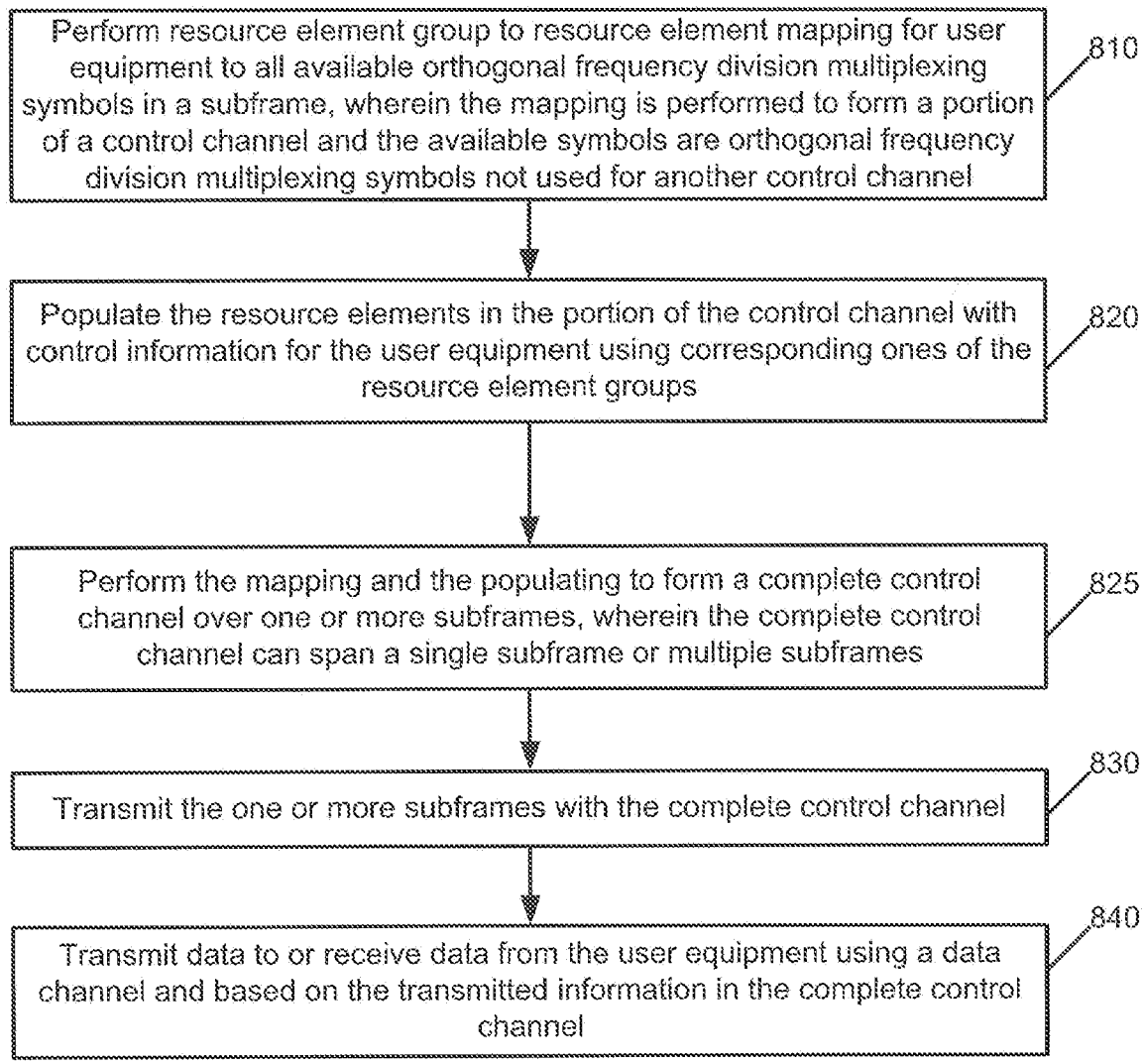
FIG. 8 is a logic flow diagram performed by a base station for control channel design and use for narrow band communication, and illustrates the operation of an exemplary method, a result of execution of computer program instructions embodied on a computer readable memory, functions performed by logic implemented in hardware, and/or interconnected means for performing functions in accordance with exemplary embodiments.

FIG. 8 is a logic flow diagram for control channel design and use for narrow band communication for a base station. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the NB CCH module 150 may include multiples ones of the blocks in FIG. 8, where each included block is an interconnected means for performing the function in the block. The blocks in FIG. 8 are assumed to be performed by a base station such as eNB 170, e.g., under control of the NB CCH module 150 at least in part.

In block 810, the base station performs resource element group to resource element mapping for user equipment to all available orthogonal frequency division multiplexing symbols in a subframe. As shown in previous figures, the subframe comprises a time-frequency resource space comprising the orthogonal frequency division multiplexing symbols in time and subcarriers in frequency. The mapping is performed to form a portion of a control channel and the available symbols are orthogonal frequency division multiplexing symbols not used for another control channel. In block 820, the base station populates the resource elements in the portion of the control channel with control information for the user equipment using corresponding ones of the resource element groups. In block 825, the base station performs the mapping and the populating to form a complete control channel over one or more subframes. The complete control channel can span a single subframe or multiple subframes, as described above. And in block 830, the base station transmits the one or more subframes with the complete control channel. Further, in block 840, the base station transmits data to or receives data from the user equipment using a data channel and based on the transmitted information in the complete control channel. Although emphasis has been placed herein in DL, it is noted that the NB-IoT applies to both DL and UL. There will be new data channels defined—NB-PDSCH and NB-PUSCH. Thus, a downlink data channel, in an exemplary embodiment, is the NB IoT downlink data channel (e.g., NB-PDSCH) and an uplink channel is, in an exemplary embodiment, the NB-IoT uplink channel (e.g., NB-PUSCH). The control channels described herein are suitable for one or both of NB-PDSCH and NB-PUSCH. The flow in FIG. 8 is also called example 1 herein.

The following are additional examples based on FIG. 8.

Example 2

The method of example 1, further comprising indicating to the user equipment the available orthogonal frequency division symbols for the one or more subframes via broadcast information.

Example 3

The method of example 1, wherein the available orthogonal frequency division symbols for the one or more subframes are implicitly indicated or are provided in a specification.

Example 4

The method of any one of examples 1 to 3, wherein the mapping is performed so that resource element groups comprise a number of consecutive resource elements in frequency but the consecutive resource elements do not include reserved resource elements, and wherein the consecutive resource elements for the resource element groups can span a reserved resource element.

Example 5

The method of any one of examples 1 to 4, wherein mapping further comprises mapping the resource element groups to resource elements per subframe in a time-first manner, followed by in a frequency manner.

Example 6

The method of example 5, wherein, in the mapping, resource elements corresponding to cell-specific reference signal positions are not used for the partial or complete control channel regardless of the actual number of transmission antenna ports used for transmission.

Example 7

The method of example 1, wherein each of the transmitted subframes contains only a single control channel that is the portion of the control channel and does not contain the other control channel.

Example 8

The method of example 1, wherein each of the transmitted subframes contains the portion of the control channel and the other control channel, wherein the other control channel uses between one and four orthogonal frequency division multiplexing symbols in each transmitted subframe and the portion of the control channel uses all other orthogonal frequency division multiplexing symbols in each transmitted subframe.

Example 9

The method of example 8, wherein mapping further comprises mapping control channel elements to resource element groups, and wherein a fixed number of control channel elements in one subframe is used regardless of a number of available resource elements in the subframe and mapping further comprises varying control channel element size in terms of number of resource element groups or number of resource elements depending on how many symbols are reserved for the other control channel.

Example 10

The method of any one of examples 1 to 9, wherein mapping further comprises mapping the resource element groups to resource elements to create different search spaces for different ones of the user equipment.

Example 11

The method of example 10, wherein: mapping further comprises mapping the resource element groups to resource elements over a plurality of subframes and at least one of the different search spaces spans multiple ones of the plurality of subframes; populating further comprises populating the resource elements in the complete control channel and its different search spaces with control information for the user equipment using corresponding ones of the resource element groups over the plurality of subframes; performing further comprises performing the mapping and the populating to form the search spaces in individual ones of the plurality of subframes or over multiples ones of the plurality of subframes; and transmitting further comprises transmitting by the base station the plurality of subframes.

Example 12

The method of example 11, wherein: mapping further comprises mapping control channel elements to resource element groups for a plurality of user equipment based on aggregation level assigned to each user equipment, wherein some aggregation levels have search spaces containing individual ones of the plurality of subframes and other aggregation levels have search spaces containing multiple ones of the plurality subframes; populating further comprises populating the control channel elements in the portion of the control channel and its different search spaces with control information for individual ones of the user equipment based on an aggregation level assigned to the individual user equipment; and performing the mapping and the populating to form a complete control channel further comprises performing the mapping and the populating so that user equipment with search spaces containing individual ones of the subframes will have control information when such information is sent within an individual one of the subframes and user equipment with search spaces containing multiple subframes will have control information when such information is sent within one or both of the individual ones of the subframes and the multiple subframes.

Example 13

The method of example 11, wherein the mapping, populating, performing, and transmitting are performed so that different search spaces are multiplexed in a time domain comprising the plurality of subframes.

Example 14

The method of any one of examples 11 to 13, wherein the mapping, populating, performing, and transmitting are performed so that a given one of the different search spaces that spans multiple ones of the plurality of subframes is distributed in time over discontinuous subframes.

Example 15

The method of any one of examples 11 to 14, wherein the mapping, populating, performing, and transmitting are performed so that a first one of the different search spaces that spans multiple ones of the plurality of subframes is distributed in time over first subframes and is used for control information for a first user equipment, wherein the mapping, populating, performing, and transmitting are performed so that a second one of the different search spaces that spans multiple ones of the plurality of subframes is distributed in time over second subframes and is used for control information for a second user equipment, and the first and second subframes are different subframes.

Example 16

The method of any one of examples 1 to 15, wherein mapping further comprises mapping control channel elements to resource element groups using consecutive resource element groups within one subframe at a time.

Example 17

The method of any one of examples 1 to 15, wherein mapping further comprises mapping control channel elements to resource element groups in a distributed or random manner.

Example 18

The method of any one of examples 1 to 17, wherein the complete control channel is a control channel for a downlink data channel, wherein the downlink data channel has multiple operational modes, and wherein the mapping is performed in a same manner for all of the multiple operation modes.

Example 19

The method of any one of examples 1 to 18, further comprising the base station transmitting data to the user equipment using a downlink data channel and based on the transmitted control information in the complete control channel or the base station receiving data from the user equipment using an uplink data channel and based on the transmitted control information in the complete control channel.

Example 20

The method of example 19, wherein the downlink data channel is a narrow band Internet of things downlink data channel and the complete control channel is the control channel for the narrow band Internet of things downlink data channel, or the uplink data channel is a narrow band Internet of things uplink data channel and the complete control channel is the control channel for the narrow band Internet of things uplink data channel.

Figure 9:
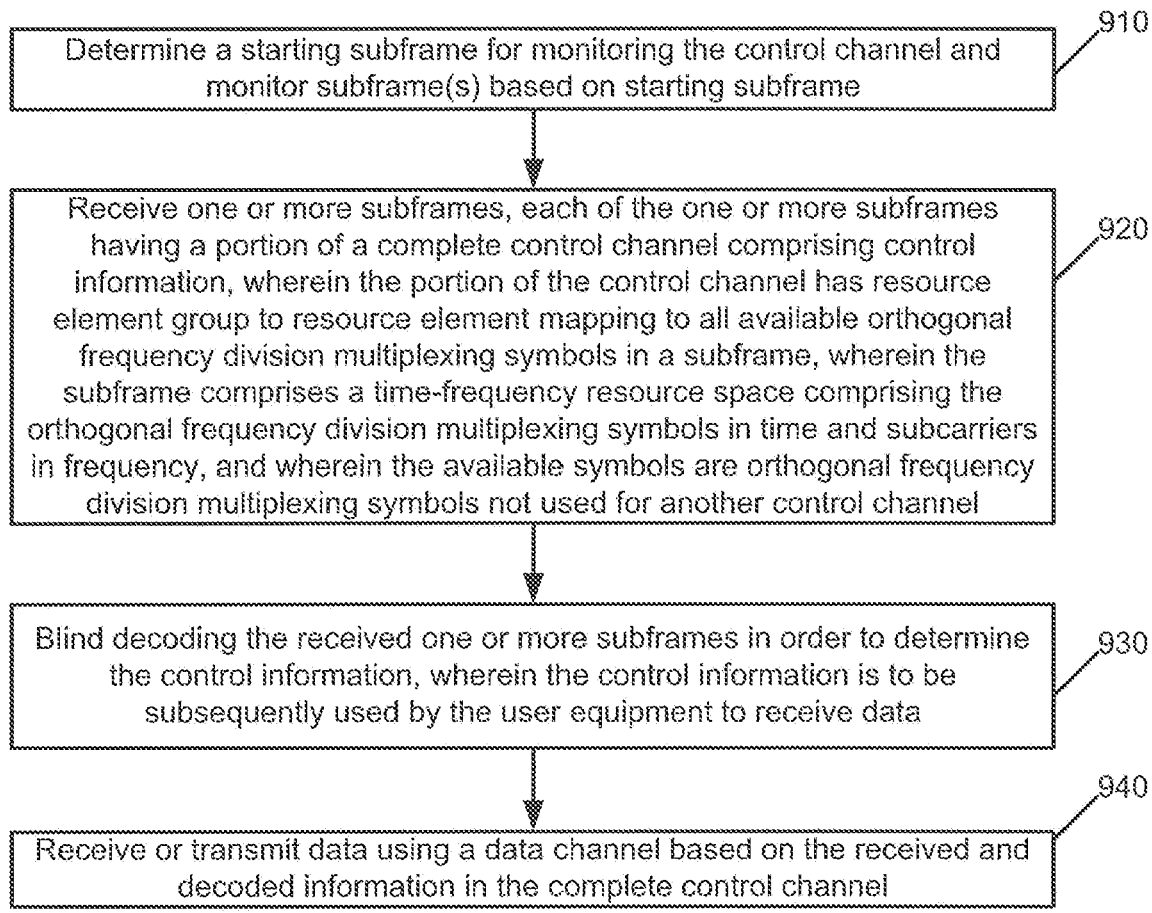
FIG. 9 is a logic flow diagram performed by a user equipment for operations with a control channel design and its use for narrow band communication, and illustrates the operation of an exemplary method, a result of execution of computer program instructions embodied on a computer readable memory, functions performed by logic implemented in hardware, and/or interconnected means for performing functions in accordance with exemplary embodiments.

FIG. 9 is a logic flow diagram for operations with a control channel design and its use for narrow band communication for a user equipment. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the NB CCH module 140 may include multiples ones of the blocks in FIG. 9, where each included block is an interconnected means for performing the function in the block. The blocks in FIG. 9 are assumed to be performed by the UE 110, e.g., under control of the NB CCH module 140 at least in part.

In block 910, the user equipment 110 determines a starting subframe for monitoring the control channel and monitors subframe(s) based on starting subframe. Determining a starting subframe and performing monitoring based thereon are described above, e.g., in reference to FIG. 7. In block 920, the user equipment 110 receives one or more subframes. Each of the one or more subframes has a portion of a complete control channel comprising control information. The portion of the control channel has resource element group to resource element mapping to all available orthogonal frequency division multiplexing symbols in a subframe. As illustrated above, the subframe comprises a time-frequency resource space comprising the orthogonal frequency division multiplexing symbols in time and subcarriers in frequency. The available symbols are orthogonal frequency division multiplexing symbols not used for another control channel. In block 930, the user equipment 110 performs blind decoding of the received one or more subframes in order to determine the control information, wherein the control information is to be subsequently used by the user equipment to receive data. In block 940, the user equipment 110 receives or transmits data using a data channel based on the received and decoded information in the complete control channel. Although emphasis has been placed herein in DL, it is noted that the NB-IoT applies to both DL and UL. There will be new data channels defined—NB-PDSCH and NB-PUSCH. Thus, a downlink data channel, in an exemplary embodiment, is the NB IoT downlink data channel (e.g., NB-PDSCH) and an uplink channel is, in an exemplary embodiment, the NB-IoT uplink channel (e.g., NB-PUSCH). The flow in FIG. 9 is also called example 21 herein.

The following are additional examples based on FIG. 9.

Example 22

The method of example 21, further comprising receiving by the user equipment indication of the available orthogonal frequency division symbols for the one or more subframes via broadcast information;

Example 23

The method of example 21, wherein the available orthogonal frequency division symbols for the one or more subframes are implicitly indicated or are provided in a specification.

Example 24

The method of any one of examples 21 to 23, wherein the mapping is such that resource element groups comprise a number of consecutive resource elements in frequency but the consecutive resource elements do not include reserved resource elements, and wherein the consecutive resource elements for the resource element groups can span a reserved resource element.

Example 25

The method of any one of examples 21 to 24, wherein mapping is such that the resource element groups are mapped to resource elements per subframe in a time-first manner, followed by in a frequency manner.

Example 26

The method of example 25, wherein, in the mapping, resource elements corresponding to cell-specific reference signal positions are not used for the partial or complete control channel regardless of the actual number of antenna ports used for transmission by a base station to the user equipment.

Example 27

The method of example 21, wherein each of the received subframes contains only a single control channel that is the portion of the control channel and does not contain the other control channel.

Example 28

The method of example 21, wherein each of the received subframes contains the portion of the control channel and the other control channel, wherein the other control channel uses between one and four orthogonal frequency division multiplexing symbols in each received subframe and the portion of the control channel uses all other orthogonal frequency division multiplexing symbols in each received subframe.

Example 29

The method of example 28, wherein mapping is such that control channel elements are mapped to resource element groups, and wherein a fixed number of control channel elements in one subframe are used regardless of a number of available resource elements in the subframe and mapping is such that control channel element size is varied in terms of number of resource element groups or number of resource elements and is dependent on how many symbols are reserved for the other control channel.

Example 30

The method of any one of examples 21 to 29, wherein: the user equipment has a search space that comprises individual ones of the one or more subframes or a plurality of the one or more subframes; and blind decoding further comprises blind decoding individual ones of the one or more subframes in order to determine the control information or blind decoding the plurality of subframes in order to determine the control information.

Example 31

The method of example 30, wherein blind decoding further comprises, in response to the user equipment having a search space comprising a plurality of the one or more subframes, performing both blind decoding individual ones of the one or more subframes in order to determine the control information and blind decoding the plurality of subframes in order to determine the control information.

Example 32

The method of any one of examples 30 to 31, wherein the search space for the user equipment spans multiple ones of the plurality of subframes and is distributed in time over discontinuous subframes, and receiving and blind decoding are performed using the multiple ones of the plurality of subframes that are distributed in time over the discontinuous subframes.

Example 33

The method of any one of examples 21 to 32, wherein the mapping is such that control channel elements are mapped to resource element groups using consecutive resource element groups within one subframe at a time.

Example 34

The method of any one of examples 21 to 32, wherein the mapping is such that control channel elements are mapped to resource element groups in a distributed or random manner.

Example 35

The method of any one of examples 21 to 34, wherein the complete control channel is a control channel for a downlink data channel, wherein the downlink data channel has multiple operational modes, and wherein the mapping is the same for all of the multiple operation modes.

Example 36

The method of any one of examples 21 to 35, further comprising the user equipment transmitting data to a base station using an uplink data channel and based on the transmitted control information in the complete control channel or the user equipment receiving data from the user equipment using a downlink data channel and based on the transmitted control information in the complete control channel.

Example 37

The method of example 36, wherein the uplink data channel is a narrow band Internet of things uplink data channel and the complete control channel is the control channel for the narrow band Internet of things uplink data channel, or the downlink data channel is a narrow band Internet of things downlink data channel and the complete control channel is the control channel for the narrow band Internet of things downlink data channel.

Example 38

The method of any one of examples 21 to 37, wherein: receiving comprises receiving a plurality of subframes, each subframe having the portion of the complete control channel comprising control information; the method further comprises determining a starting subframe for monitoring the portion of the control channel therein at least by determining valid subframes in the plurality of subframes; and receiving further comprises, starting at the determined subframe number, monitoring the portion of the control channel in subframes corresponding to every K valid subframes and every K*N valid subframes, where N is a number of repetitions the control information is repeated.

Example 39

The method of example 38, wherein the valid subframes are subframes not used for any of the following: a physical broadcast channel, a primary synchronization signal, a secondary synchronization signal, or a system information block.

The following are additional examples.

Another example is example 40, a computer program comprising computer-readable code for performing the method of any one of examples 1 to 39.

Example 41

The computer program according to example 40, wherein the computer program is a computer program product comprising a computer-readable medium bearing computer program code embodied therein for use with a computer.

Example 42

An apparatus, comprising: means for mapping, at a base station, resource element groups to resource elements for user equipment to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel; means for populating, at the base station, the resource elements in the portion of the control channel with control information for the user equipment using corresponding ones of the resource element groups; means for performing the mapping and the populating to form a complete control channel over one or more subframes, wherein the complete control channel can span a single subframe or multiple subframes; and means for transmitting by the base station the one or more subframes with the complete control channel.

Example 43

The apparatus of example 42, further comprising means for indicating to the user equipment the available orthogonal frequency division symbols for the one or more subframes via broadcast information.

Example 44

The apparatus of example 42, wherein the available orthogonal frequency division symbols for the one or more subframes are implicitly indicated or are provided in a specification.

Example 45

The apparatus of any one of examples 42 to 44, wherein the means for mapping performs mapping so that resource element groups comprise a number of consecutive resource elements in frequency but the consecutive resource elements do not include reserved resource elements, and wherein the consecutive resource elements for the resource element groups can span a reserved resource element.

Example 46

The apparatus of any one of examples 42 to 45, wherein the means for mapping further comprises means for mapping the resource element groups to resource elements per subframe in a time-first manner, followed by in a frequency manner.

Example 47

The apparatus of example 46, wherein, in the mapping, resource elements corresponding to cell-specific reference signal positions are not used for the partial or complete control channel regardless of the actual number of transmission antenna ports used for transmission.

Example 48

The apparatus of example 42, wherein each of the transmitted subframes contains only a single control channel that is the portion of the control channel and does not contain the other control channel.

Example 49

The apparatus of example 42, wherein each of the transmitted subframes contains the portion of the control channel and the other control channel, wherein the other control channel uses between one and four orthogonal frequency division multiplexing symbols in each transmitted subframe and the portion of the control channel uses all other orthogonal frequency division multiplexing symbols in each transmitted subframe.

Example 50

The apparatus of example 49, wherein the means for mapping further comprises means for mapping control channel elements to resource element groups, and wherein a fixed number of control channel elements in one subframe is used regardless of a number of available resource elements in the subframe and mapping further comprises varying control channel element size in terms of number of resource element groups or number of resource elements depending on how many symbols are reserved for the other control channel.

Example 51

The apparatus of any one of examples 42 to 50, wherein the means for mapping further comprises means for mapping the resource element groups to resource elements to create different search spaces for different ones of the user equipment.

Example 52

The apparatus of example 51, wherein: the means for mapping further comprises means for mapping the resource element groups to resource elements over a plurality of subframes and at least one of the different search spaces spans multiple ones of the plurality of subframes; the means for populating further comprises means for populating the resource elements in the complete control channel and its different search spaces with control information for the user equipment using corresponding ones of the resource element groups over the plurality of subframes; the means for performing further comprises means for performing the mapping and the populating to form the search spaces in individual ones of the plurality of subframes or over multiples ones of the plurality of subframes; and means for transmitting further comprises means for transmitting by the base station the plurality of subframes.

Example 53

The apparatus of example 52, wherein: the means for mapping further comprises means for mapping control channel elements to resource element groups for a plurality of user equipment based on aggregation level assigned to each user equipment, wherein some aggregation levels have search spaces containing individual ones of the plurality of subframes and other aggregation levels have search spaces containing multiple ones of the plurality subframes; the means for populating further comprises means for populating the control channel elements in the portion of the control channel and its different search spaces with control information for individual ones of the user equipment based on an aggregation level assigned to the individual user equipment; and the means for performing the mapping and the populating to form a complete control channel further comprises means for performing the mapping and the populating so that user equipment with search spaces containing individual ones of the subframes will have control information when such information is sent within an individual one of the subframes and user equipment with search spaces containing multiple subframes will have control information when such information is sent within one or both of the individual ones of the subframes and the multiple subframes.

Example 54

The apparatus of example 52, wherein the means for mapping, means for populating, means for performing, and means for transmitting perform their respective functions so that different search spaces are multiplexed in a time domain comprising the plurality of subframes.

Example 55

The apparatus of any one of examples 52 to 54, wherein the means for mapping, means for populating, means for performing, and means for transmitting perform their respective functions so that a given one of the different search spaces that spans multiple ones of the plurality of subframes is distributed in time over discontinuous subframes.

Example 56

The apparatus of any one of examples 52 to 55, wherein the means for mapping, means for populating, means for performing, and means for transmitting perform their respective functions so that a first one of the different search spaces that spans multiple ones of the plurality of subframes is distributed in time over first subframes and is used for control information for a first user equipment, wherein the means for mapping, means for populating, means for performing, and means for transmitting perform their respective functions so that a second one of the different search spaces that spans multiple ones of the plurality of subframes is distributed in time over second subframes and is used for control information for a second user equipment, and the first and second subframes are different subframes.

Example 57

The apparatus of any one of examples 42 to 56, wherein the means for mapping further comprises means for mapping control channel elements to resource element groups using consecutive resource element groups within one subframe at a time.

Example 58

The apparatus of any one of examples 42 to 56, wherein the means for mapping further comprises means for mapping control channel elements to resource element groups in a distributed or random manner.

Example 59

The apparatus of any one of examples 42 to 58, wherein the complete control channel is a control channel for a downlink data channel, wherein the downlink data channel has multiple operational modes, and wherein the mapping is performed in a same manner for all of the multiple operation modes.

Example 60

The apparatus of any one of examples 42 to 59, further comprising means for the base station to transmit data to the user equipment using a downlink data channel and based on the transmitted control information in the complete control channel or means for the base station to receive data from the user equipment using an uplink data channel and based on the transmitted control information in the complete control channel.

Example 61

The apparatus of example 60, wherein the downlink data channel is a narrow band Internet of things downlink data channel and the complete control channel is the control channel for the narrow band Internet of things downlink data channel, or the uplink data channel is a narrow band Internet of things uplink data channel and the complete control channel is the control channel for the narrow band Internet of things uplink data channel.

Example 62

An apparatus, comprising: means for receiving at a user equipment one or more subframes, each of the one or more subframes having a portion of a complete control channel comprising control information, wherein the portion of the control channel has resource element group to resource element mapping to all available orthogonal frequency division multiplexing symbols in a subframe, wherein the subframe comprises a time-frequency resource space comprising the orthogonal frequency division multiplexing symbols in time and subcarriers in frequency, and wherein the available symbols are orthogonal frequency division multiplexing symbols not used for another control channel; and means for blind decoding the received one or more subframes in order to determine the control information, wherein the control information is to be subsequently used by the user equipment to transmit or receive data.

Example 63

The apparatus of example 62, further comprising means for receiving by the user equipment indication of the available orthogonal frequency division symbols for the one or more subframes via broadcast information.

Example 64

The apparatus of example 62, wherein the available orthogonal frequency division symbols for the one or more subframes are implicitly indicated or are provided in a specification.

Example 65

The apparatus of any one of examples 62 to 64, wherein the mapping is such that resource element groups comprise a number of consecutive resource elements in frequency but the consecutive resource elements do not include reserved resource elements, and wherein the consecutive resource elements for the resource element groups can span a reserved resource element.

Example 66

The apparatus of any one of examples 62 to 65, wherein mapping is such that the resource element groups are mapped to resource elements per subframe in a time-first manner, followed by in a frequency manner.

Example 67

The apparatus of example 66, wherein, in the mapping, resource elements corresponding to cell-specific reference signal positions are not used for the partial or complete control channel regardless of the actual number of antenna ports used for transmission by a base station to the user equipment.

Example 68

The apparatus of example 62, wherein each of the received subframes contains only a single control channel that is the portion of the control channel and does not contain the other control channel.

Example 69

The apparatus of example 62, wherein each of the received subframes contains the portion of the control channel and the other control channel, wherein the other control channel uses between one and four orthogonal frequency division multiplexing symbols in each received subframe and the portion of the control channel uses all other orthogonal frequency division multiplexing symbols in each received subframe.

Example 70

The apparatus of example 69, wherein mapping is such that control channel elements are mapped to resource element groups, and wherein a fixed number of control channel elements in one subframe are used regardless of a number of available resource elements in the subframe and mapping is such that control channel element size is varied in terms of number of resource element groups or number of resource elements and is dependent on how many symbols are reserved for the other control channel.

Example 71

The apparatus of any one of examples 62 to 70, wherein: the user equipment has a search space that comprises individual ones of the one or more subframes or a plurality of the one or more subframes; and the means for blind decoding further comprises means for blind decoding individual ones of the one or more subframes in order to determine the control information or blind decoding the plurality of subframes in order to determine the control information.

Example 72

The apparatus of example 71, wherein the means for blind decoding further comprises means, responsive to the user equipment having a search space comprising a plurality of the one or more subframes, for performing both blind decoding individual ones of the one or more subframes in order to determine the control information and blind decoding the plurality of subframes in order to determine the control information.

Example 73

The apparatus of any one of examples 71 to 72, wherein the search space for the user equipment spans multiple ones of the plurality of subframes and is distributed in time over discontinuous subframes, and the means for receiving and means for blind decoding perform their respective functions using the multiple ones of the plurality of subframes that are distributed in time over the discontinuous subframes.

Example 74

The apparatus of any one of examples 62 to 73, wherein the mapping is such that control channel elements are mapped to resource element groups using consecutive resource element groups within one subframe at a time.

Example 75

The apparatus of any one of examples 62 to 73, wherein the mapping is such that control channel elements are mapped to resource element groups in a distributed or random manner.

Example 76

The apparatus of any one of examples 62 to 74, wherein the complete control channel is a control channel for a downlink data channel, wherein the downlink data channel has multiple operational modes, and wherein the mapping is the same for all of the multiple operation modes.

Example 77

The apparatus of any one of examples 62 to 76, further comprising means for the user equipment to transmit data to a base station using an uplink data channel and based on the transmitted control information in the complete control channel or means for the user equipment to receive data from the user equipment using a downlink data channel and based on the transmitted control information in the complete control channel.

Example 78

The apparatus of example 77, wherein the uplink data channel is a narrow band Internet of things uplink data channel and the complete control channel is the control channel for the narrow band Internet of things uplink data channel, or the downlink data channel is a narrow band Internet of things downlink data channel and the complete control channel is the control channel for the narrow band Internet of things downlink data channel.

Example 79

The apparatus of any one of examples 62 to 78, wherein: the means for receiving comprises means for receiving a plurality of subframes, each subframe having the portion of the complete control channel comprising control information; the apparatus further comprises means for determining a starting subframe for monitoring the portion of the control channel therein at least by determining valid subframes in the plurality of subframes; and the means for receiving further comprises means, starting at the determined subframe number, for monitoring the portion of the control channel in subframes corresponding to every K valid subframes and every K*N valid subframes, where N is a number of repetitions the control information is repeated.

Example 80

The apparatus of example 79, wherein the valid subframes are subframes not used for any of the following: a physical broadcast channel, a primary synchronization signal, a secondary synchronization signal, or a system information block.

Example 81

A base station comprising any of the apparatus of examples 42 to 61.

Example 82

A user equipment comprising any of the apparatus of examples 62 to 80.

Example 83

A system comprising any of the apparatus of examples 42 to 61 and any of the apparatus of examples 62 to 80.

Without in any way limiting the scope, interpretation, or application of the claims appearing below, a technical effect of one or more of the example embodiments disclosed herein is construction of a control channel that is consistent among all operation modes for a narrow band downlink channel Another technical effect of one or more of the example embodiments disclosed herein is efficient multiplexing of NB-PDCCHs from UEs with different search spaces. Another technical effect of one or more of the example embodiments disclosed herein is support for time discontinuous search spaces that can provide some time diversity gain and minimize blocking probability.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
AL aggregation level

BW bandwidth
CCE control channel element
CCH control channel
CRS cell-specific reference signal
dB decibels
DL downlink (from base station to UE)
eNB (or eNodeB) evolved Node B (e.g., an LTE base station)
ePDCCH enhanced PDCCH
kHz kilo-Hertz
GERAN GSM/EDGE radio access network
GSM global system for mobile communications
I/F interface
IoT Internet of things
LTE long term evolution
MHz mega-Hertz
MME mobility management entity
ins millisecond
NB narrow band
NB-PDSCH narrow band-physical downlink shared channel
NB-PUSCH narrow band-physical uplink shared channel
NCE network control element
N/W network
OFDM orthogonal frequency division multiplexing
PBCH physical broadcast channel
PDCCH physical downlink control channel
PRB physical resource block
PSS primary synchronization signal
RAN radio access network
RE resource element
REG resource element group
RRH remote radio head
Rx receiver or reception
SF subframe
SFBC space frequency block code
SFN subframe number
SGW serving gateway
SIB system information block
SSS secondary synchronization signal
TDM time division multiplexing
Tx transmitter or transmission
UE user equipment (e.g., a wireless, typically mobile device)
UL uplink (from UE to base station)
WID working item description

What is claimed is:

1. A method, comprising: mapping, at a base station, control channel elements to resource elements for user equipments to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel, wherein the mapping is performed so that control channel elements comprise a number of consecutive resource elements in frequency but the consecutive resource elements do not include reserved resource elements, and wherein at least some sets of the consecutive resource elements for the control channel elements can span one of the reserved resource elements; populating, at the base station, the resource elements in the portion of the control channel with control information for the user equipments using corresponding ones of the control channel elements; performing the mapping and the populating to form a complete control channel over one or more subframes, wherein the complete control channel can span a single subframe or multiple subframes; and transmitting by the base station the one or more subframes with the complete control channel.

2. The method of claim 1, further comprising indicating to the user equipments the available orthogonal frequency division symbols for the one or more subframes via broadcast information.

3. The method of claim 1, wherein the mapping further comprises mapping control channel elements to resource element groups and mapping the resource element groups to resource elements per subframe in a time-first manner, followed by in a frequency manner.

4. The method of claim 3, wherein resource elements corresponding to cell-specific reference signal positions are not used for a partial or the complete control channel regardless of an actual number of transmission antenna ports used for transmission.

5. The method of claim 1, wherein each of the transmitted subframes contains only a single control channel that is the portion of the control channel and does not contain the other control channel.

6. The method of claim 1, wherein each of the transmitted subframes contains the portion of the control channel and the other control channel, wherein the other control channel uses between one and four orthogonal frequency division multiplexing symbols in each transmitted subframe and the portion of the control channel uses all other orthogonal frequency division multiplexing symbols in each transmitted subframe.

7. The method of claim 6, wherein the mapping further comprises mapping control channel elements to resource element groups, and wherein a fixed number of control channel elements in one subframe is used regardless of a number of available resource elements in the subframe and the mapping further comprises varying control channel element size in terms of number of resource element groups or number of resource elements depending on how many symbols are reserved for the other control channel.

8. The method of claim 1, wherein the mapping further comprises mapping control channel elements to resource element groups and mapping the resource element groups to resource elements to create different search spaces for different ones of the user equipments.

9. The method of claim 8, wherein: the mapping further comprises mapping the resource element groups to resource elements over a plurality of subframes and at least one of the different search spaces spans multiple ones of the plurality of subframes; populating further comprises populating the resource elements in the complete control channel and its different search spaces with control information for the user equipments using corresponding ones of the resource element groups over the plurality of subframes; performing further comprises performing the mapping and the populating to form the search spaces in individual ones of the plurality of subframes or over multiples ones of the plurality of subframes; and transmitting further comprises transmitting by the base station the plurality of subframes.

10. The method of claim 9, wherein: the mapping further comprises mapping control channel elements to resource element groups for a plurality of the user equipments based on aggregation level assigned to each user equipment, wherein some aggregation levels have search spaces containing individual ones of the plurality of subframes and other aggregation levels have search spaces containing multiple ones of the plurality subframes; populating further comprises populating the control channel elements in the portion of the control channel and its different search spaces with control information for individual ones of the user equipments based on an aggregation level assigned to the individual user equipment; and performing the mapping and the populating to form the complete control channel further comprises performing the mapping and the populating so that user equipments with search spaces containing individual ones of the subframes will have control information when such information is sent within an individual one of the subframes and user equipments with search spaces containing multiple subframes will have control information when such information is sent within one or both of the individual ones of the subframes and the multiple subframes.

11. The method of claim 9, wherein the mapping, populating, performing, and transmitting are performed so that the different search spaces are multiplexed in a time domain comprising the plurality of subframes.

12. The method of claim 1, wherein the mapping further comprises mapping control channel elements to resource element groups using consecutive resource element groups within one subframe at a time.

13. The method of claim 1, wherein the complete control channel is a control channel for a downlink data channel, wherein the downlink data channel has multiple operational modes, and wherein the mapping is performed in a same manner for all of the multiple operation modes.

14. The method of claim 1, further comprising the base station transmitting data to the user equipments using a downlink data channel and based on the transmitted control information in the complete control channel or the base station receiving data from the user equipments using an uplink data channel and based on the transmitted control information in the complete control channel.

15. The method of claim 14, wherein the downlink data channel is a narrow band Internet of things downlink data channel and the complete control channel is the control channel for the narrow band Internet of things downlink data channel, or the uplink data channel is a narrow band Internet of things uplink data channel and the complete control channel is the control channel for the narrow band Internet of things uplink data channel.

16. A computer program product comprising a non-transitory computer-readable storage medium bearing computer program code embodied therein for use with a computer, the computer program code configured to cause the computer to perform the method of claim 1.

17. An apparatus, comprising: at least one processor; and at least one memory including computer program code, wherein the at least one memory and the computer program code are configured to, with the at least one processor, cause the apparatus to perform at least the following: mapping, at a base station, control channel elements to resource elements for user equipments to all available orthogonal frequency division multiplexing symbols for a subframe, wherein the subframe comprises a time-frequency resource space comprising the orthogonal frequency division multiplexing symbols in time and subcarriers in frequency, and wherein the mapping is performed to form a portion of a control channel and the available symbols are orthogonal frequency division multiplexing symbols not used for another control channel, wherein the mapping is performed so that control channel elements comprise a number of consecutive resource elements in frequency but the consecutive resource elements do not include reserved resource elements, and wherein at least some sets of the consecutive resource elements for the control channel elements can span one of the reserved resource elements; populating, at the base station, the resource elements in the portion of the control channel with control information for the user equipments using corresponding ones of the control channel elements; performing the mapping and the populating to form a complete control channel over one or more subframes, wherein the complete control channel can span a single subframe or multiple subframes; and transmitting by the base station the one or more subframes with the complete control channel.

18. An apparatus, comprising:
at least one processor; and
at least one memory including computer program code, wherein
the at least one memory and the computer program code are configured to, with the at least one processor, cause the apparatus to perform at least the following:
receiving at a user equipment one or more subframes, each of the one or more subframes having a portion of a complete control channel comprising control information, wherein the portion of the control channel has control channel element to resource element mapping to all available orthogonal frequency division multiplexing symbols in a subframe, wherein the subframe comprises a time-frequency resource space comprising the orthogonal frequency division multiplexing symbols in time and subcarriers in frequency, and wherein the available symbols are orthogonal frequency division multiplexing symbols not used for another control channel, wherein the mapping is performed so that control channel elements comprise a number of consecutive resource elements in frequency but the consecutive resource elements do not include reserved resource elements, and wherein at least some sets of the consecutive resource elements for the control channel elements can span one of the reserved resource elements; and
blind decoding the received one or more subframes in order to determine the control information, wherein the control information is to be subsequently used by the user equipment to receive data.

* * * * *